Patented July 19, 1949

2,476,527

UNITED STATES PATENT OFFICE

2,476,527

REVERSIBLE GEL COMPOSITION AND METHOD OF PREPARATION

Carl E. Barnes, Belvidere, N. J., and William O. Ney, Jr., Easton, Pa., assignors to General Aniline & Film Corporation, New York, N. Y., a corporation of Delaware No Drawing. Application October 25, 1944, Serial No. 560,360

12 Claims. (Cl. 260—8)

This invention relates to the preparation of thermal-reversible gels from interpolymers of acrylic acid or α-substituted acrylic acids with their amides, as well as the gels prepared therefrom.

Heretofore, thermal-reversible gels have been prepared from polyvinyl alcohol by adding to the latter various gelling agents as are shown in United States Patents Nos. 2,234,186, 2,249,536, 2,249,537 and 2,249,538. The prior art patents, however, are not concerned with an interpolymer which of itself forms thermal-reversible gels from its solutions, since polyvinyl alcohol is ordinarily a water-soluble material and does not alone show the properties of a gel. The patents above referred to all require the addition of some gelling agent in order to impart gelling properties to this material.

It is accordingly among the objects of our invention to produce a gel which is converted into a liquid when heated, but which on cooling again sets to form a gel. Another object is to produce a gel from a synthetic substance to serve as a substitute for a gelatin and similar natural products.

Another object of our invention is to provide a synthetic material which possesses the property of thermal-reversible gelation under certain conditions without the addition of a gelling agent.

It is a still further object of our invention to provide a material capable of forming firm, strong gels in an aqueous medium.

We have found that when certain interpolymers produced from acrylic acid and α-substituted acrylic acid with their amides are dissolved at a slightly elevated temperature in an aqueous solution so that the pH of the resulting solution ranges from about 4 to 9, the solution on cooling sets to form a gel which is thermal-reversible.

The exact properties of the interpolymer which we employ in producing our thermal-reversible gel are determined in part by the ratio of the free acid to the amide in the interpolymerization mixture. Also affecting the properties are the pH of the aqueous medium in which the interpolymer is dissolved as well as the presence or absence of certain metal ions, such as alkali and alkaline metal salts of the polymeric substances.

The preferred pH range to produce desirable gelling properties for various compositions of methacrylic acid and methacrylic amide interpolymers is indicated in the following table. The parts are by weight.

| Composition of Interpolymer | | Preferred pH Range |
|---|---|---|
| Acid | Amide | |
| 25 | 75 | 4.5–7.0 |
| 50 | 50 | 5.0–6.5 |
| 75 | 25 | 6.0–6.5 |

The addition of metal ions, such as aluminum and chromium tends to reduce the solubility and harden the gel.

The properties of the interpolymeric substances may be further varied through wide ranges by the incorporation into the polymer molecule of other interpolymerizable vinyl compounds, as for example esters of acrylic acid or vinyl esters, such as acrylic acid methyl ester and vinyl acetate.

Alcohol groups may be introduced into the acrylic acid-acrylamide polymerization mixture by incorporating vinyl esters capable of interpolymerization and then subsequently hydrolyzing or partially hydrolyzing the polymer by well-known hydrolysis methods, such as used in the preparing of polyvinyl alcohol from polyvinyl acetate and other esters. This increases the permeability of the gel formed to water. The strength of the gel and the tendency to form gel structures may be increased by increasing the ratio of certain groups which exhibit strong attractive forces, such as hydroxyl, amino, amide, formyl, carboxyl, nitrile, and similar polar groups.

It is also possible to control the viscosity of solutions of given strength of the interpolymer, at least in part, by varying the polymerization conditions by well-known methods to increase or decrease the molecular weight of the polymer produced such as by varying the amount of the catalyst, the temperature, or the degree of polymerization and the proportions of the monomers. The viscosity as well as the tendency to form gels may also be controlled by certain after treatments of the polymer. Thus, if the polymer is one containing free carboxyl groups, then these may be partially esterified with a polyhydric alcohol, such as ethylene glycol or glycerol. On the other hand, if the polymer contains hydroxyl groups, esterification with a polybasic acid produces a similar effect.

The following examples are illustrative of our invention:

Example 1

20 grams each of methacrylic acid and methacrylamide are dissolved in 100 cc. of distilled water and 0.1 gram of benzoyl peroxide as the polymerization catalyst is added. This mixture it heated to 70–90° for about ½ hour, after which time, an insoluble polymer has precipitated. This material may be redissolved in hot water made slightly alkaline with a few drops of five percent ammonium hydroxide or sodium hydroxide solution so that the pH of the solution of the polymer is about 5–6.5. The solution upon cooling sets to a firm, strong gel at a temperature of about 35–45° C. This gel is thermal-reversible, that is, on heating it melts to form a liquid and when cooled again forms the gel. The exact melting temperature depends partly upon the concentration of the solution and partly on the pH of the mixture. The melting point may also be changed by varying the ratio of amide to acid in the original mixture.

This interpolymer is compatible with aqueous gelatin solutions in all proportions.

Example 2

15 grams of methacrylic acid, and 15 grams of methacrylamide, and 5 grams of methylacrylate are added to 100 cc. of distilled water and 0.1 gram of benzoyl peroxide are added to the mixture as a polymerization catalyst. Upon heating to 60° C. or higher, a homogeneous solution is obtained which polymerizes to form a water-insoluble product. However, solutions of this material may be prepared as in Example 1 by redissolving in hot water made slightly alkaline and on cooling form gels which are thermo-reversible. The gels formed are tougher than those which are obtained from the product described in Example 1.

Example 3

To a solution prepared according to Example 1 but containing about 8 percent of the interpolymer described therein was added about 2 per cent of gelatin at a temperature of about 40° C. Upon cooling, the solution formed a firm, strong gel. The presence of the gelatin appeared to plasticize the mixture and rendered it particularly adhesive when coated upon glass. The coating formed is unique in its unusual resistance to abrasion without any hardening treatment.

Example 4

40 grams each of methacrylic acid and methacrylamide are added to 300 cc. of water in the presence of 0.1 gram of benzoyl peroxide. The mixture is heated for several hours at 85–90° C. until slight precipitation and an increase in viscosity occurs. Then 300 cc. of water is added and the heating is continued at the same temperature until a further increase in viscosity occurs. Then an additional 300 cc. of water is added and the heating continued until a gel-like material is formed.

This product is dissolved in twice its weight of 0.2 N sodium hydroxide solution at room temperature and the material precipitated from its solution by adding 0.2 N sulfuric acid. The filtered material may be washed with organic solvents, such as acetone to remove any residual catalyst if desired, which, if present, may fog the photographic emulsion.

The washed material is then dissolved in 0.2 N sodium hydroxide and brought to a pH of from 6–7, by addition of dilute solution of any suitable acid, as for example, sulfuric acid, acetic or methacrylic acid. The solution sets to a thermal-reversible gel.

Solutions containing as little as 2% of the interpolymer will form gels on cooling. The range of concentration of the interpolymer may be varied to suit the uses of the gels formed. An 8% solution has been found suitable for preparing light-sensitive photographic emulsions.

As pointed out above, the melting point of the interpolymer gel may be changed by varying the ratio of amide to acid in the polymerization mixture. Accordingly, what ratios will be used will depend on the melting point desired in the final product. Likewise, the addition of the acrylic acid and vinyl esters to the interpolymerization mixture will be varied in accordance with the amount of strength that is desired in the final product. Similar considerations also apply with respect to the amount of polyvinyl alcohols employed or other compounds containing groups which exhibit strong attractive forces. In this case, the amounts added will depend on the desired amount of permeability of the gel to water and the desired amount of gel-forming properties desired in the final product.

With respect to the preparation of the interpolymer of acrylic acid and alpha-substituted acrylic acid with their amides, in addition to methacrylic acid and methacrylic amide mentioned in the examples, there may also be used acrylic acid and acryl amide, alpha-phenyl acrylamide, alpha-chloroacryl amide and the other alpha-substituted acrylic acids and acryl amides.

In addition to benzoyl peroxide as a catalyst for the interpolymerization action, there may be used other catalysts, such as ammonium persulfate, sodium perborate, percarbonic and perphosphoric acid, hydrogen peroxide, ozonides, or other compounds which release oxygen, and controlled amounts of atmospheric oxygen. The catalyst is generally used in small amounts, ranging from about 0.01–2% by weight of the polymerizable organic compounds. About 0.2% has been found desirable in most instances. The temperature at which the polymerization may be carried out may range from about 20–100° C., although a range of from 60–90° C. is preferable.

While heating the aqueous medium in which the interpolymeric product is dissolved facilitates solution thereof, such solution may be carried out at room temperature if desired by using a stronger alkaline solution and rapid stirring and following with addition of a suitable acid to bring the pH within the gelling range.

The pH of the solution of the interpolymeric product may range from about 4 to approximately 9, although the preferred range is from 4.5–7. If the solution becomes too acid, the interpolymer will precipitate therefrom without gel formation. If the solution is too alkaline, the interpolymer will not gel but will remain in solution. However, when the pH of the solution is controlled within the range above set forth, gelation thereof takes place. Only a few drops of an alkaline solution are necessary to impart the desired pH of the solution. For this purpose a 5% solution of either ammonium hydroxide, sodium hydroxide, or potassium hydroxide may be used as well as solutions of any alkali metal salts and hydroxides, such as carbonates. Also water-soluble amines, for example, methylamine, ethylamine, triethylamine, and pyridine, have been found suitable for this purpose.

The gels which we obtained in accordance with our invention have wide and varied uses. They may, for example, be used in producing photographic emulsions in which they serve as a protective colloid for sensitive materials, such as silver halides. This is described in our application Ser. No. 560,359, filed of even date herewith, now Patent Number 2,461,023. Cast in the form of sheeting the gels may be used for production of safelights or light filters when properly colored with suitable coloring materials. Likewise, the gels may be used as subbing layers in photographic films, as overcoatings or as a backing for films. An outstanding advantage of these films is that they require no hardening treatment with such hardening elements as formaldehyde, bichromate, and chrome alum. When used with a small amount of gelatin, the latter serves as a plasticizer and provides for good adhesion between the coating and the support. Thus they may also be used as adhesives or thickening agents.

Unlike gelatin and similar natural products, our gelled interpolymer, may be produced with standardized properties and definite purity so that there is no variation in different batches.

We claim:

1. A firm, thermal-reversible gel which comprises the interpolymer of a compound selected from the group consisting of acrylic acid and α-substituted acrylic acid with their amides in which the ratio of the acid to the amide ranges from about 25-75 for the acid to about 75-25 for the amide, and gelatin in an amount less than that of the interpolymer, said gel having a pH of about 4-9, the fluid component of the gel being water.

2. A firm, thermal-reversible gel which comprises the interpolymer of a compound selected from the group consisting of acrylic acid and α-substituted acrylic acid with their amides in which the ratio of the acid to the amide ranges from about 25-75 for the acid to about 75-25 for the amide, and gelatin in an amount less than that of the interpolymer, said gel having a pH of about 4.5-7, the fluid component of the gel being water.

3. A firm, thermal-reversible gel which comprises the interpolymer of from about 25-75 parts of methacrylic acid with from about 75-25 parts of methacrylamide and gelatin in an amount less than that of the interpolymer, said gel having a pH of from about 4-9, the fluid component of the gel being water.

4. A firm, thermal-reversible gel which comprises the interpolymerization product of substantially equal amounts of methacrylic acid and methacrylamide and gelatin in an amount less than that of the interpolymer, said gel having a pH of about 5-6.5, the fluid component of the gel being water.

5. A firm, thermal-reversible gel which comprises the interpolymerization product of substantially equal amounts of methacrylic acid and methacrylamide and gelatin in an amount less than that of the interpolymer, said gel having a pH of about 6-7, the fluid component of the gel being water.

6. A method of preparing a thermal-reversible hydrogel which comprises dissolving in water made slightly alkaline so that the solution formed has a pH of about 4-9, the interpolymerization product of a compound selected from the group consisting of acrylic acid and α-substituted acrylic acid with their amides in which the ratio of the acid to the amide ranges from about 25-75 for the acid to about 75-25 for the amide, and gelatin in an amount less than that of the interpolymer, and permitting the solution to gel.

7. A method of preparing a thermal-reversible hydrogel which comprises dissolving at an elevated temperature in water made slightly alkaline so that the solution formed has a pH of about 4-9, an interpolymer of from about 25-75 parts of methacrylic acid with from about 75-25 parts of methacrylamide, and gelatin in an amount less than that of the interpolymer, and cooling the solution to a point at which the formation of a gel occurs.

8. A method of preparing a thermal-reversible hydrogel which comprises dissolving at an elevated temperature in water made slightly alkaline so that the solution formed has a pH of about 5-6.5, an interpolymerization product of substantially equal amounts of methacrylic acid and methacrylamide, and gelatin in an amount less than that of the interpolymer, and cooling the solution to a point at which the formation of a gel occurs.

9. A method of preparing a thermal-reversible hydrogel which comprises dissolving at an elevated temperature in water made slightly alkaline so that the solution formed has a pH of about 6-7, an interpolymerization product of substantially equal amounts of methacrylic acid and methacrylamide, and gelatin in an amount less than that of the interpolymer, and cooling the solution to a point at which the formation of a gel occurs.

10. A method of preparing a thermal-reversible hydrogel which comprises dissolving at an elevated temperature in water made slightly alkaline so that the solution formed has a pH of about 4-9, the interpolymerization product of a compound selected from the group consisting of acrylic acid and α-substituted acrylic acid with their amides in which the ratio of the acid to the amide ranges from about 75-25 for the acid to about 75-25 for the amide, and gelatin in an amount less than that of the interpolymer, and cooling the solution to a point at which the formation of a gel occurs.

11. A firm, thermal-reversible gel according to claim 3 in which the interpolymer comprises, in addition to the acid and amide components, methyl acrylate in an amount less than that of said components.

12. A method according to claim 7 in which the interpolymer comprises, in addition to the acid and amide components, methylacrylate in an amount materially below that of said components.

CARL E. BARNES.
WILLIAM O. NEY, JR.

REFERENCES CITED

The following references are of record in the file of this patent:

UNITED STATES PATENTS

| Number | Name | Date |
|---|---|---|
| 1,976,679 | Fikentscher | Oct. 9, 1934 |
| 2,006,002 | Schneider | June 25, 1935 |
| 2,120,933 | Dittmar | June 14, 1938 |
| 2,200,709 | Trommsdorff | May 14, 1940 |
| 2,205,883 | Graves | June 25, 1940 |
| 2,244,703 | Hubbuch | June 10, 1941 |

OTHER REFERENCES

Lewis et al., "Industrial Chemistry of Colloidal and Amorphous Materials," New York, MacMillan Co., 1943, page 225.